May 1, 1962  R. H. GANZ  3,031,813
METHOD AND MACHINE FOR APPLYING DIVIDERS TO BOTTLES
Filed Aug. 3, 1960  9 Sheets-Sheet 1
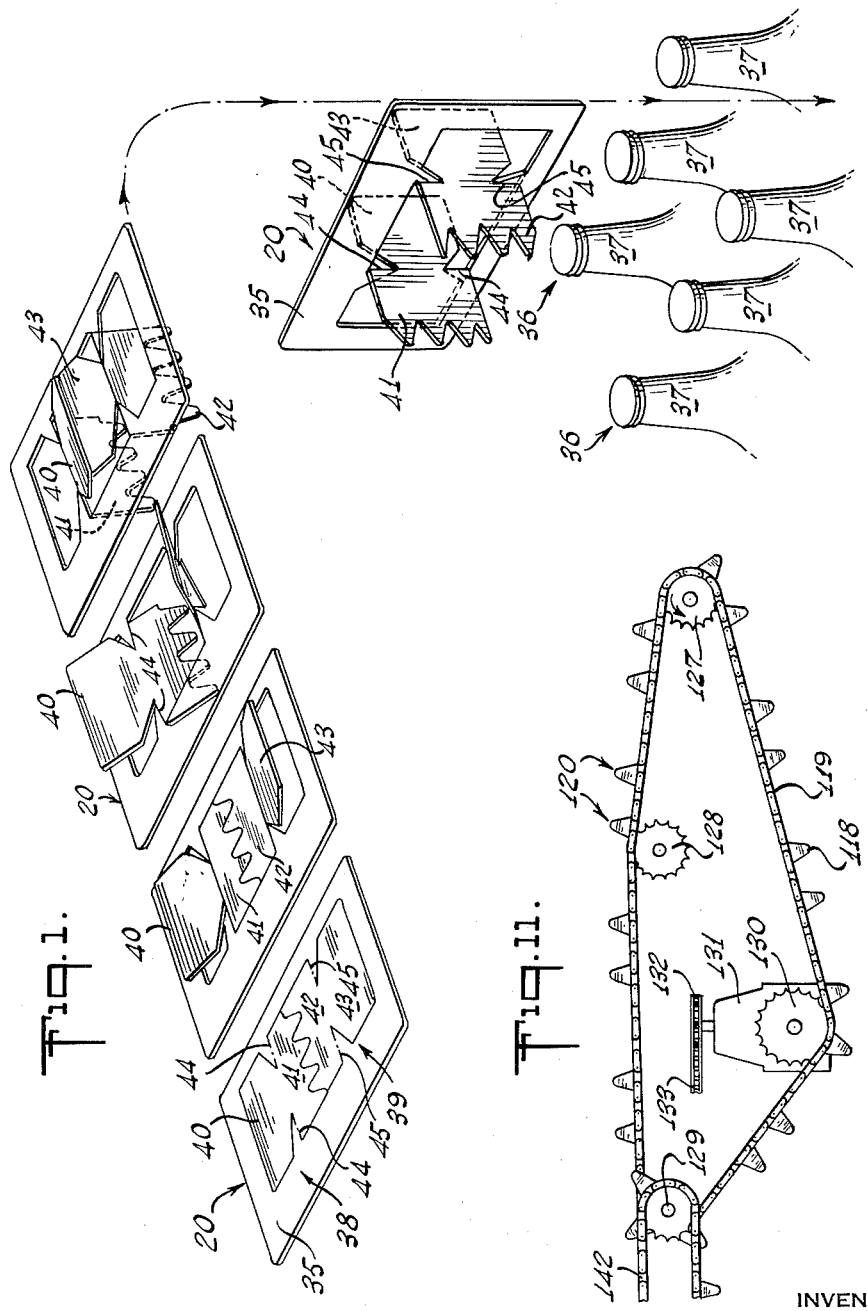
INVENTOR
ROBERT H. GANZ
BY
Robertson F. Smythe
ATTORNEY May 1, 1962 R. H. GANZ 3,031,813
METHOD AND MACHINE FOR APPLYING DIVIDERS TO BOTTLES
Filed Aug. 3, 1960 9 Sheets-Sheet 3
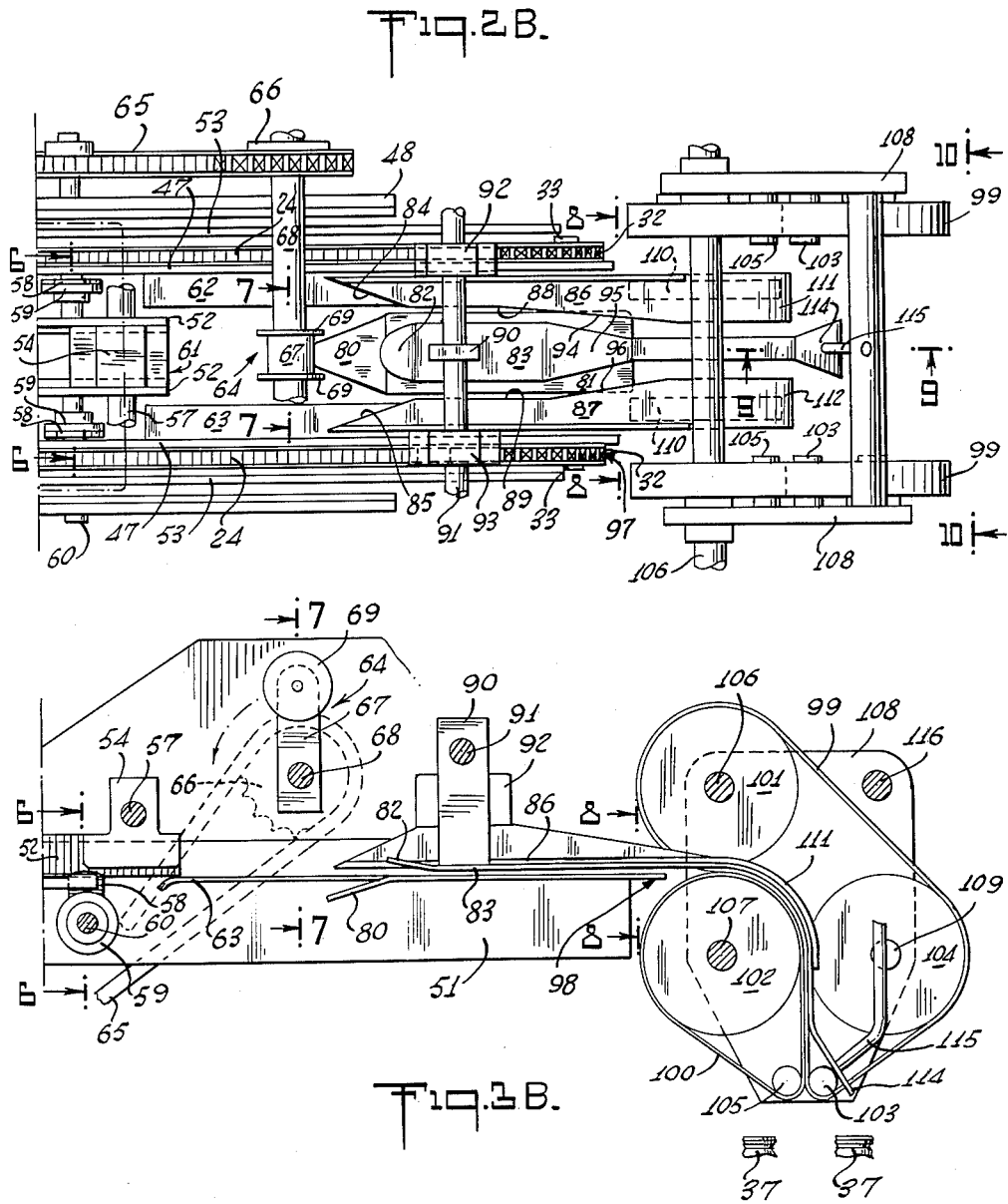
INVENTOR
ROBERT H. GANZ
BY
ATTORNEYS

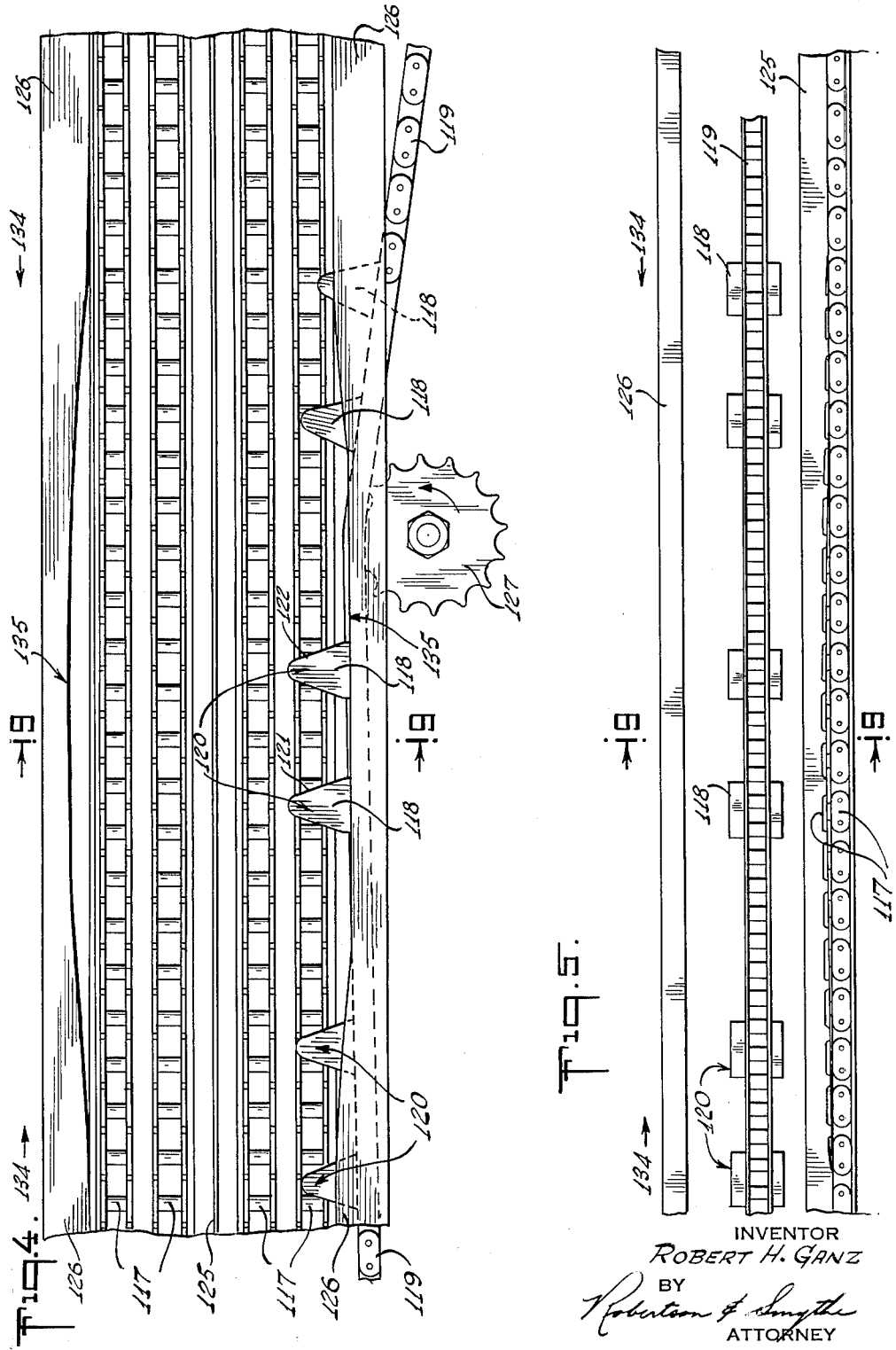

May 1, 1962 R. H. GANZ 3,031,813
METHOD AND MACHINE FOR APPLYING DIVIDERS TO BOTTLES
Filed Aug. 3, 1960 9 Sheets-Sheet 5

INVENTOR
ROBERT H. GANZ
BY
ATTORNEY

May 1, 1962 R. H. GANZ 3,031,813
METHOD AND MACHINE FOR APPLYING DIVIDERS TO BOTTLES
Filed Aug. 3, 1960 9 Sheets-Sheet 7

INVENTOR
ROBERT H. GANZ
BY
Robertson & Smythe
ATTORNEYS

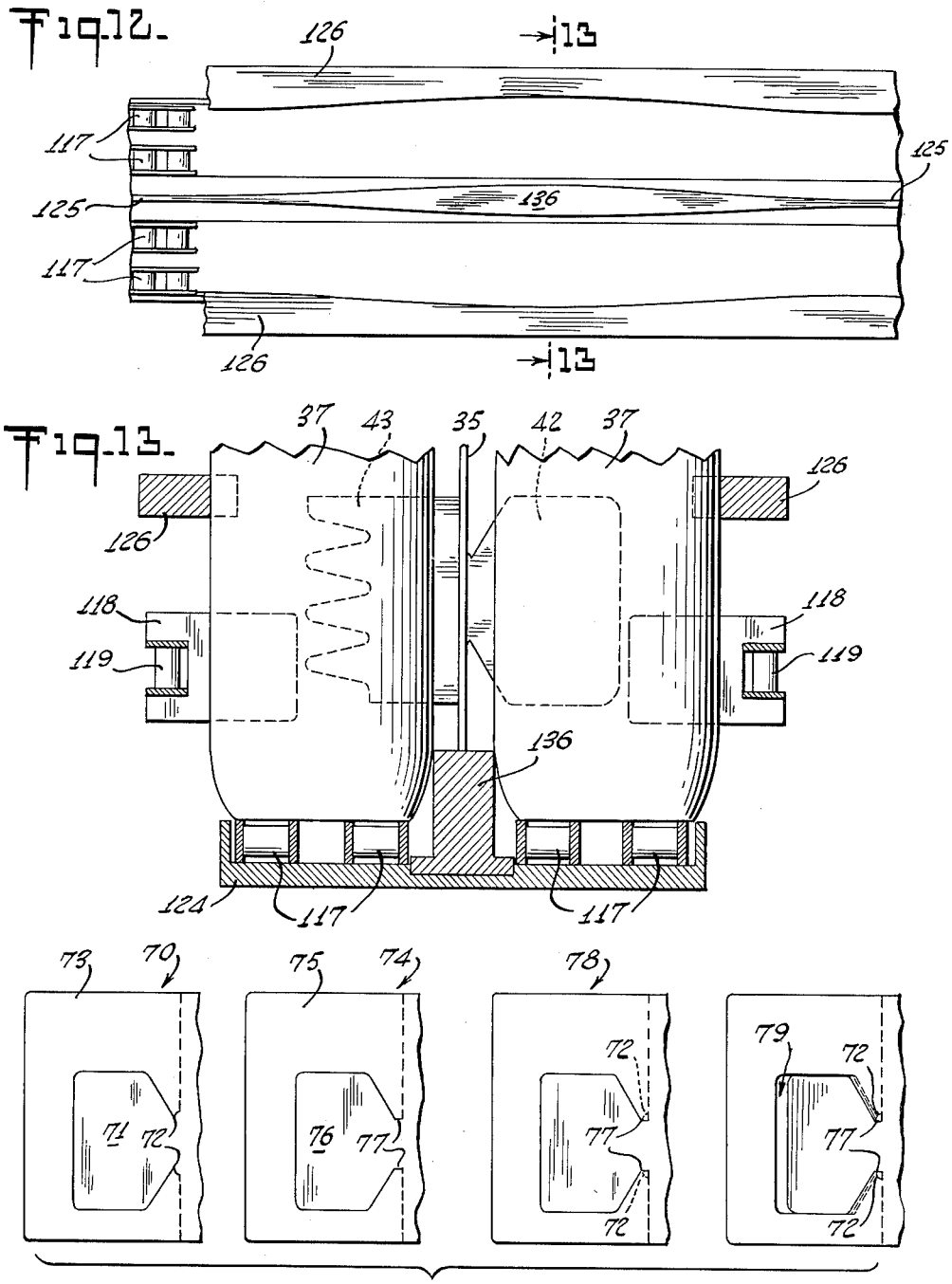

May 1, 1962 R. H. GANZ 3,031,813
METHOD AND MACHINE FOR APPLYING DIVIDERS TO BOTTLES
Filed Aug. 3, 1960 9 Sheets-Sheet 9
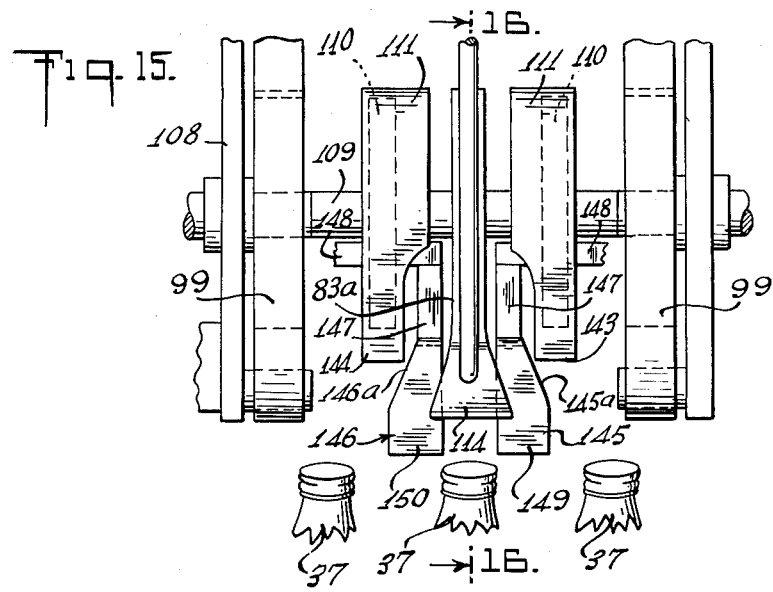
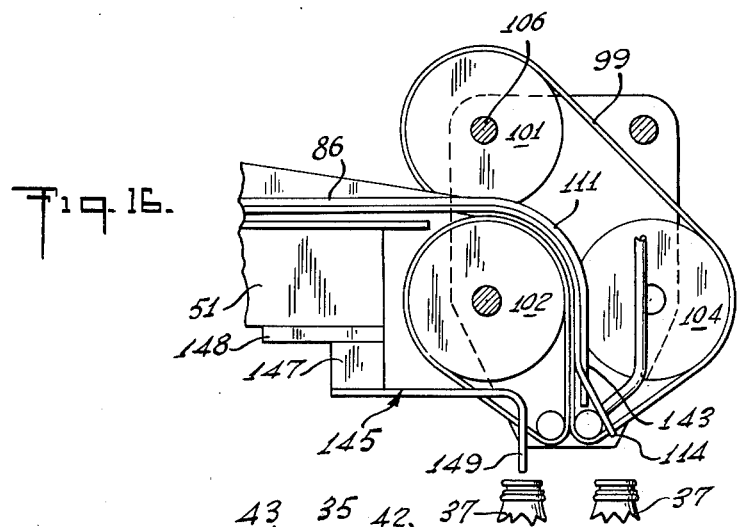
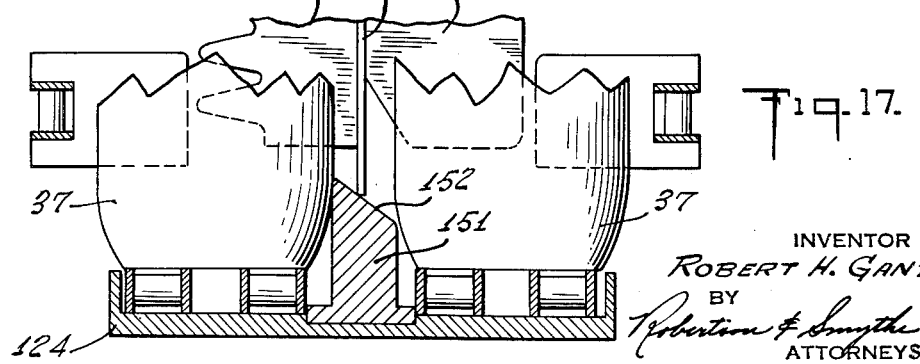
INVENTOR
ROBERT H. GANZ
BY
Robertson & Smythe
ATTORNEYS

3,031,813
METHOD AND MACHINE FOR APPLYING DIVIDERS TO BOTTLES

Robert H. Ganz, Hackensack, N.J., assignor to Continental Can Company, Inc., New York, N.Y., a corporation of New York
Filed Aug. 3, 1960, Ser. No. 47,293
19 Claims. (Cl. 53—157)

This invention relates to the packaging of bottles and the like in which a divider is applied to the bottles to separate them from one another. My invention has special application for use with wrap-around paperboard carriers. Wrap-around carriers are commonly used with cans and other containers which are not of a fragile nature. In the case of applying wrap-around paperboard carriers to groups of bottles it is advantageous to insert dividers to separate the bottles from one another, not only for the purpose of protecting the bottles from breakage but also in order to comply with the requirements of common carriers and other agencies which handle such goods.

Summary

In accordance with my invention, the bottles are delivered into the machine by a conveyor. The divider blanks are delivered into the machine on a conveyor which is disposed at right angles to and above the line of travel of the containers. The divider blanks are provided with a longitudinal partition which is adapted to divide the rows of containers to be packaged and also lateral partitions which are adapted to divide the containers in a row from one another. The lateral partitions are rotatably mounted in pairs about a common axis and they extend away from one another in the plane of the longitudinal partition.

As the divider blanks advance into the machine along the divider blank conveyor, they pass beneath a folder which is synchronized with the conveyor and which forces the lateral partitions adjacent the end portions of the divider blank upwardly about their mounting axis. Upon further advancement of the divider blank, it passes beneath an additional folder which engages the inner partitions of each pair and folds them downwardly. At this point the pairs of lateral partitions are deflected away from one another and at an angle to the longitudinal partition.

As the carton blank continues to advance into the machine the upwardly extending lateral partitions are engaged by folding bars which subsequently fold the partitions down upon one another as they are supported by a guide. The divider blank conveyor then carries the blanks beyond the end of the conveyor and into engagement with moving belts which are arranged around a plurality of pulleys and which are adapted to advance and rotate the divider blank in such a manner that the longitudinal partition assumes a vertical position. As the divider blank is rotated by the belts the lower extending lateral partitions are maintained in position by contact with rollers positioned beneath the path of travel of the belts. As the divider blank is rotated to a position wherein the longitudinal partition is in a vertical plane, the overlapped upper lateral partitions are deflected away from one another so that they assume a position substantially at right angles to the plane of the longitudinal partitions and substantially in alignment with the other extending lateral partitions.

The moving belts and the related elements which rotate the longitudinal partition to the vertical plane are positioned over the container conveyor. The line of travel of the longitudinal partition of the divider blank is aligned with the center line of the container conveyor beneath. As the containers advance along the container conveyor they approach the portion beneath the means for inserting the divider blanks between the bottles. At the location along the container conveyor which is beneath the inserting means it is necessary to separate the containers from one another in order that the downwardly moving divider blank may be received. The separation of the bottles along a row may be obtained by spacing pusher elements at intervals greater than the dimension of the bottles along the line of travel. For the case where the containers are continually urged in the direction toward the machine, lug members may be provided to hold the containers against the incoming line pressure. Separation of the containers in one row from another row must also be obtained to provide the necessary clearance for the lateral partitions of the divider. To obtain this clearance the rows of containers at the location beneath the inserting means may be tilted outwardly away from one another so that a varying clearance is established between them having its widest portion at the upper portions of the containers. Clearance for the longitudinal partition may also be obtained by separating the two rows of containers beneath the inserting means by the use of a guide member disposed between the rows and having divergent and convergent end portions arranged in the direction of travel through the machine. With the containers separated from one another in a row and with the rows separated from each other, clearance is provided so that the erected divider blank can be inserted from above. The velocity of the drive belts of the inserting means and its synchronization with the container conveyor insures the rapid and smooth entry of the divider between the containers.

Description

In the drawings, I have illustrated a machine to show the best mode contemplated by me of carrying out my invention for applying a divider blank to containers which are subsequently to be packaged in groups.

FIG. 1 is a perspective view of the erection of the lateral partitions of the divider blank and the insertion of the divider blank between the bottles.

FIGS. 2A and 2B, when joined along the dash lines, are a plan view of the machine.

FIGS. 3A and 3B, when joined along the dash lines, are a vertical sectional view of the machine.

FIG. 4 is an enlarged plan view of the container separating means.

FIG. 5 is an enlarged elevational view of the container separating means.

FIG. 11 is a plan view of the driving chains for the separating means.

FIG. 12 is a plan view of a modified form of the separating means.

FIG. 13 is an enlarged vertical sectional view of the modified form of the separating means taken along the line 13—13 in FIG. 12.

FIG. 14 is a plurality of fragmentary plan views of a modified form of the divider blank.

FIG. 15 is an enlarged elevational view of the inserting means showing a modified form of guides for the divider blank partitions.

FIG. 16 is a vertical sectional view of the modified form of the guides taken along the line 16—16 in FIG. 15.

FIG. 17 is an enlarged vertical sectional view of a modified form of the guide members for separating the rows of bottles.

Figure 2A:
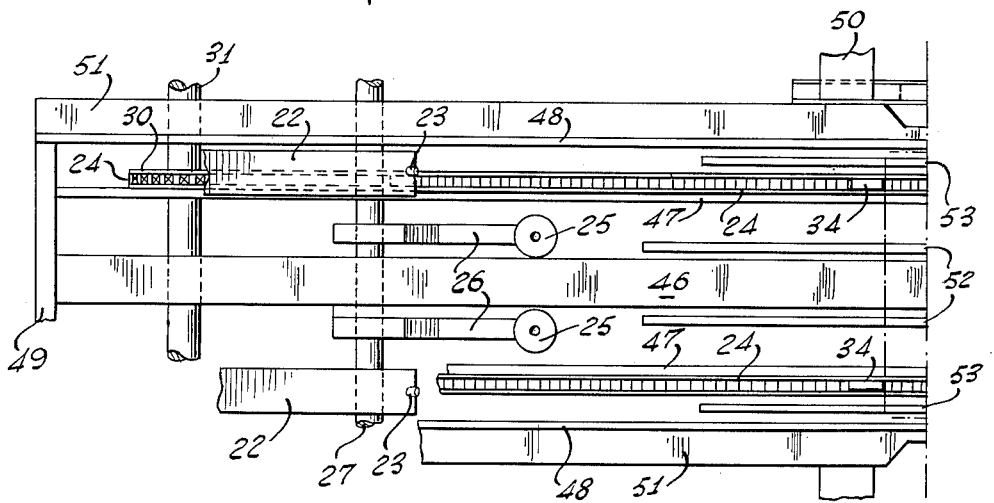
Figure 3A:
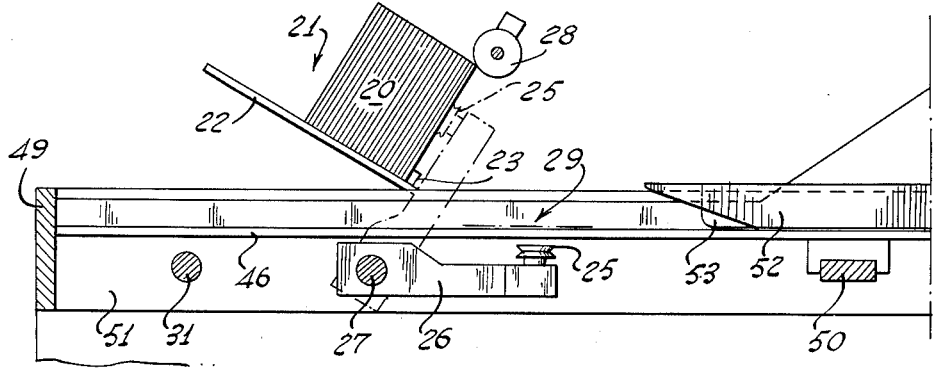

A plan view of the machine is obtained by placing FIG. 2A to the left of FIG. 2B and, similarly, an elevational view is obtained by placing FIG. 3A to the left of FIG. 3B. Divider blanks 20 are stored in hopper 21 which includes bed plate 22 having stops 23. The divider blanks are bed onto divider blank conveyor 24 by the action of suction cups 25 attached to arms 26 which are driven by shaft 27. The motion of shaft 27 swings arms 26 so that suction cups 25 strip the outer divider blank from the blanks supported in hopper 21 and pulls it past supporting wheels 28 at the upper portions of the blanks and stops 23. The divider blank is placed upon conveyor 24 at position 29 shown by a dash line in FIG. 3A. Divider blank conveyor 24 operates around sprockets 30 mounted upon shaft 31 and sprockets 32 mounted upon shaft 33. Pushers 34 attached to conveyor 24 move divider blanks 20 to the right as viewed in FIGS. 2A, 2B, 3A and 3B.

Divider blank 20 (FIG. 1) includes longitudinal partition 35 which is adapted for positioning between rows 36 of bottles 37. Pairs of lateral partitions 38, 39 including lateral partitions 40, 41 and 42, 43, respectively, are rotatably mounted in longitudinal partition 35 and in flat form are disposed substantially within the plane of the longitudinal partition. Fold lines 44, 45 attach lateral partitions 41 and 42, respectively, to longitudinal partitions 35.

Upon being fed from hopper 21, divider blanks 20 are placed upon divider blank conveyor 24 and are additionally supported by plate 46 and rails 47 adjacent to the conveyor. In the lateral direction, the divider blanks are positioned by side guides 48 adjacent to the outer portions of divider blank 24. Rails 47 and plate 46 are supported by cross members 49 and 50. The cross members are attached to frame members 51 which also supports side guides 48. The divider blanks are held flush against divider blank conveyor 24, rails 47 and plate 46 by means of rails 52 and 53 overlying the path of travel of the blanks. Rails 52 are supported by bracket 54.

The erection of divider blank 20 is initiated by the contact of folding lugs 58 attached to discs 59 which are driven in rotation by shaft 60. The rotating folding lugs are synchronized with the travel of divider blank conveyor 24 and are positioned so that they apply an upward force to lateral partitions 40 and 43 causing them to be deflected upwardly and out of the plane of longitudinal partition 35. The holding action of rails 52 and 53, overlying the divider blanks, supports them during the upward folding of lateral partitions 40 and 43. The divider blank is then advanced beyond the end 61 of plate 46 and enters upon plates 62 and 63. The divider blank passes beneath rotating folder 64 which is driven in a counter-clockwise direction as viewed in FIG. 3B by means of drive chain 65 passing over sprocket 66. Folder 64 includes arm 67 mounted upon shaft 68 with folding rollers 69 being supported by the arm.

Figure 6:
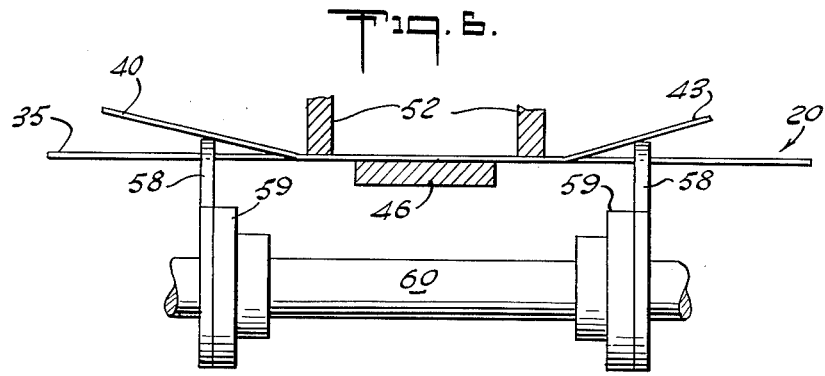
FIG. 6 is an enlarged vertical sectional view of the rotating folder taken along the line 6—6 in FIGS. 2B and 3B.

The contact of folding lugs 58 upon lateral partitions 40 and 43 (FIG. 6) forces them upwardly and out of the plane of longitudinal partition 35. In order to hold lateral partitions 40 and 43 upwardly, divider blank 20 may be constructed as shown in FIG. 14. In this modification the divider is constructed from two layers of paperboard overlying and in contact with one another. In layer 70 lateral partition 71 is provided with tabs 72 extending into longitudinal partition 73. Layer 74 which is adapted to overlie and contact layer 70 consists of longitudinal partition 75 and lateral partition 76 which has substantially square cuts 77. By assembling layer 74 over layer 73, a composite divider blank 78 is obtained. In the composite blank square cuts 77 are adjacent to tabs 72 which extend beneath them. Upon deflecting the composite lateral partition formed from lateral partitions 71 and 76 until the deflected position 79 is obtained, square cuts 77 pass over tabs 72 which spring back into place thereby blocking the return motion of the partition. Thus as in the lateral partition is deflected it is locked and its return motion is prevented by the action of tabs 72.

Figure 7:
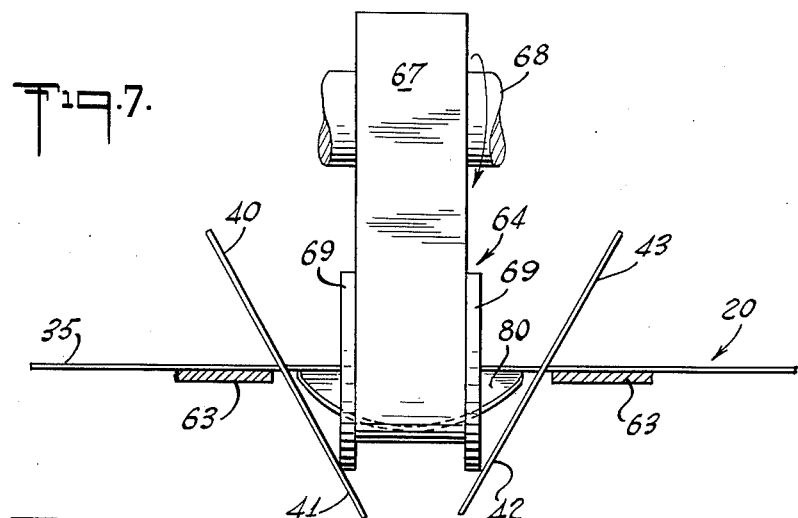
FIG. 7 is an enlarged vertical sectional view of the additional rotating folder taken along the line 7—7 in FIGS. 2B and 3B.
Figure 8:
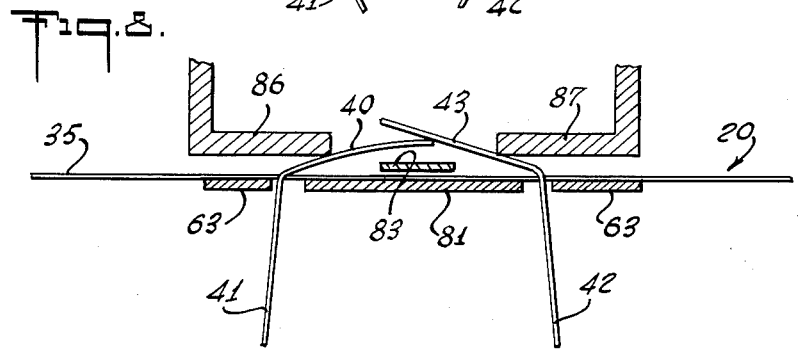
FIG. 8 is an enlarged vertical sectional view of the folding bars taken along the line 8—8 in FIGS. 2B and 3B.
Figure 9:
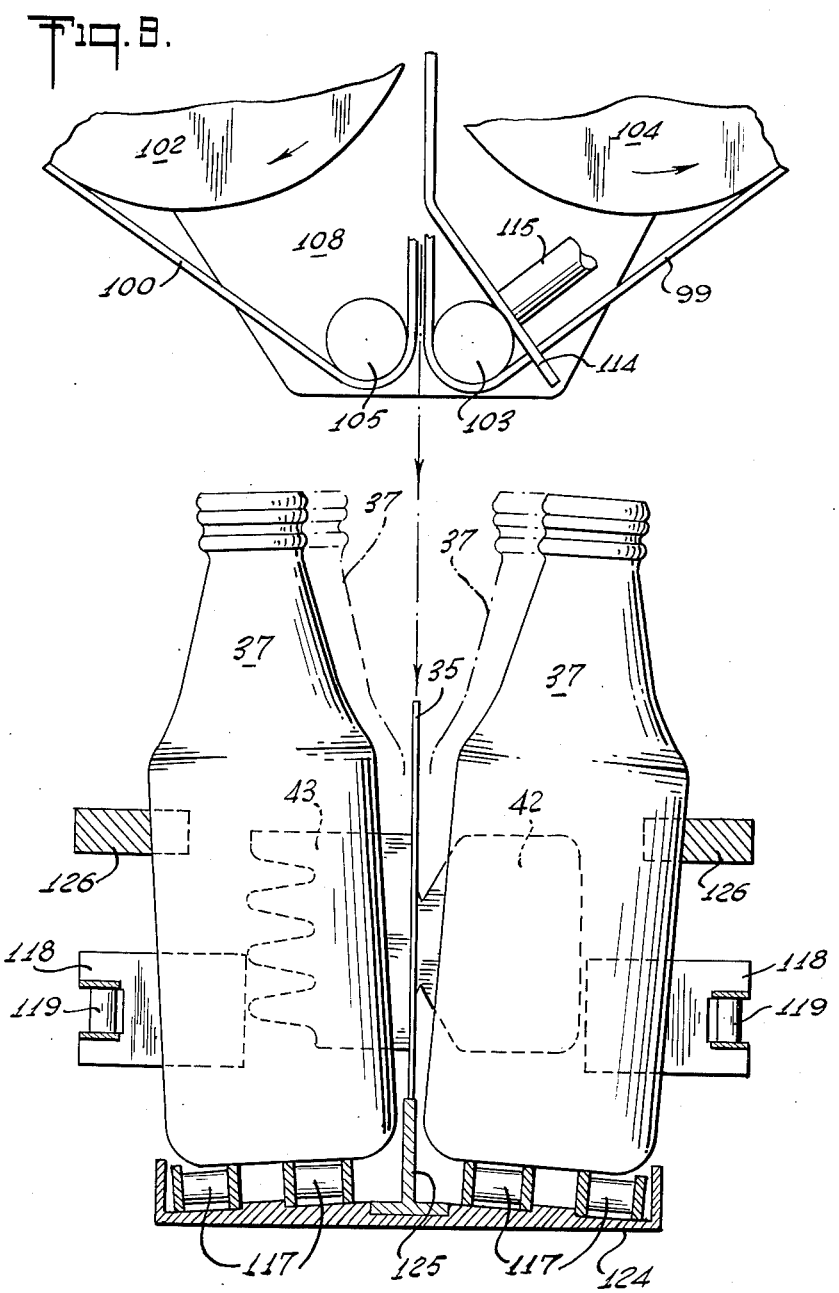
FIG. 9 is an enlarged vertical sectional view of the inserting means and the separating means taken along line 9—9 of FIGS. 2B, 4, 5 and 10.

As lateral partitions 41 and 42 are folded downwardly by the urging of rollers 69, blank 20 is advanced forward until the leading edges of lateral partitions 41 and 42 contact the edges of tongue portion 80 of plate 81. The wedging action of the edges of tongue portion 80 on lateral partitions 41 and 42 swings them into a position at substantially right angles to longitudinal partition 35. Further movement of the divider blank passes the portion of the longitudinal partition between fold lines 44 and 45 beneath the curved end portion of guide 83. The leading edges of lateral partitions 40 and 43 (FIG. 7) which are outwardly deflected contact tapered edges 84 and 85 of folding bars 86 and 87, respectively, overlying plates 62 and 63. As the divider blanks are advanced beyond the tapered edges of the folding bars lateral partitions 40 and 43 contact edges 88 and 89 of folding bars 86 and 87, respectively. Guide 83 is supported in an overlying position at a distance from plate 81 by means of bracket 90 mounted upon bar 91. Folding bars 86 and 87 are supported by brackets 92 and 93, respectively, mounted upon bar 91. The leading edge of lateral partition 40 then contacts tapered edge 94 of folding bar 86 and the partition folded downwardly onto converging portion 95 of guide 83. Subsequently, the leading edge of lateral partition 43 contacts tapered edge 96 of folding bar 87 and the partition is folded down onto partition 40.

As carton blank 20 passes beyond end portion 97 of divider blank conveyor 24 and end portions 98 of plates 63, the blank enters between moving belts 99 and 100 which pass over pulleys 101 and 102, respectively. As shown in FIG. 3B, belts 99 are driven in a counter-clockwise direction over pulleys 101 and pass in contact with belts 100 until they turn across pulleys 103 and 104. Belts 100 pass in a clockwise manner over pulleys 102 and subsequently travel in contact with belts 99 until belts 100 pass over pulleys 105. Belts 99 and 100 which have contacting portions operating in the same direction are adapted to engage and drive blank 20 between them. Pulleys 101, 102, and 104 are mounted upon shafts 106, 107, and 109, respectively, which are supported by plates 108. Plates 108 also support pulleys 103 and 105.

As divider blank 20 passes between belts 99 and 100 longitudinal partition 35 enters upon rollers 110 and downwardly extending partitions 41 and 42 pass outside the rollers supported by shaft 107. Overlying rollers 110 are curved portions 111 and 112 of folding bars 86 and 87 which guide the divider blank as it is deformed by passing between belts 99 and 100. As the divider blank passes between the belts, lateral partitions 40 and 43 remain folded across one another and overlie curved portions 83a of guide 83. When the divider blank is driven beyond pulleys 103 and 105, deflector 114 urges lateral partitions 40 and 43 in an outward direction so that they assume a position substantially at right angles to longitudinal partition 35. At the same time that the divider blank passes between the belts, lateral partitions 41 and 42 contact rollers 110 and are folded additionally away from one another to insure that tabs 72 lock and prevent a reverse movement of the partitions. Rollers 110 cause partitions 41 and 42 to pass beneath curved portions 111 and 112 where the outward folding is completed. Deflector 114 which extends outwardly from the planes of belts 99 and 100 in contact with one another is supported by rod 115 attached to bar 116 which is supported by plates 108.

Figure 10:
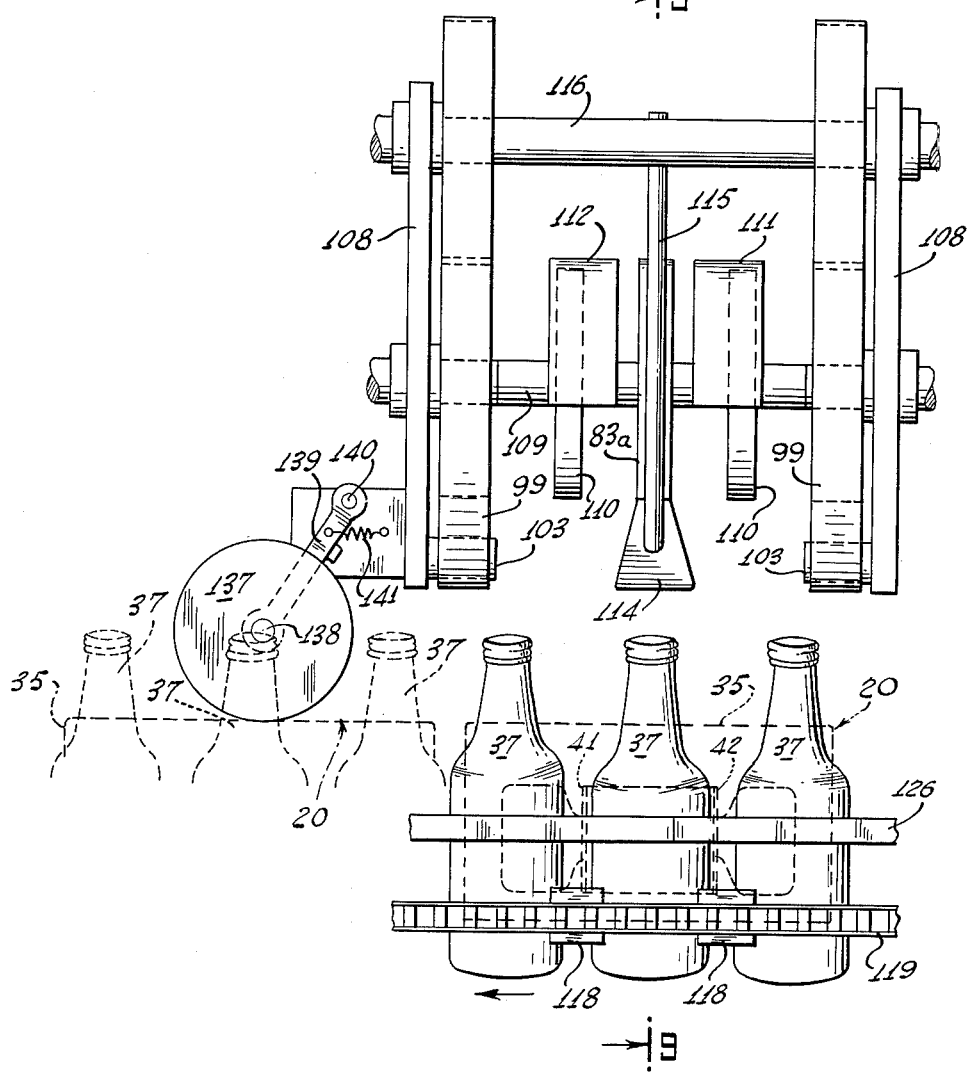
FIG. 10 is an enlarged elevational view of the inserting means and separating means taken along the line 10—10 of FIG. 2B.

Bottles 37 are delivered into the machine (FIG. 10) by means of container conveyor 117. Container conveyor 117 urges the bottles constantly toward the means for inserting the divider blanks. In order to provide spacing in a row between the bottles, lug members 118 are attached to chain 119 in pairs 120 having predetermined intervals between them greater than the dimension of the bottles in the direction of travel. As shown in FIG. 10 the middle and trailing bottles of a group having three bottles in each row will bear against surfaces 121 and 122 of the lug members 118 in a pair while the leading bottle will bear against the trailing bottle in the preceding group. Clearance is established about the middle bottles of a group in order to permit the free insertion of the lateral partitions of the divider blank.

The bottles are advanced by container conveyor 117 underlying them. The container conveyor is supported by base 124 which additionally supports centrally located elevated rail 125. Guides 126 hold the bottles in position along the conveyor. Chains 119 (FIG. 11) which travel over sprockets 127, 128 and 129 are driven by sprocket 130 which is mounted on gear box 131. Drive to gear box 131 is provided by means of sprockets 132 over which runs drive chain 133. Sprockets 127 and 128 cause chains 117 to approach bottles 37 at an angle so that lug members 118 smoothly enter between the bottles and gradually take up the line pressure being applied by container conveyors 117.

To provide sufficient clearance between the upper portions of bottles 37 in order to receive longitudinal partition 35, the bottles of each row may be tilted outwardly from one another. The tilting action is achieved by providing a portion to base 124 having a sloping section 134 so that conveyor chains 117 supported thereon will provide a sloping supporting surface to the bottoms of the bottles. In FIG. 4, the sloping section 134 is indicated by arrows. Adjacent to sloping section 134 guides 126 are relieved as indicated by arrow 135 to accommodate the tilt of the bottles. Container conveyor 117 (FIG. 5) has sufficient looseness so that it may be twisted to conform to the sloping section. The entry of lug members 118 (FIG. 4) to provide the required spacing between the bottles in each row occurs as the bottles enter the sloping section with the result that the provision of clearance around the bottles occurs simultaneously. It is evident that the provision of clearance along the rows and between the rows may be conducted in other predetermined orders.

In place of tilting the rows of bottles away from each other in order to provide clearance for longitudinal partitions 35 the rows of bottles may be diverted away from one another. Guide member 136 having wedge-like end portions may be positioned in line with elevated rail 125 at the location where the divider is to be inserted. Guides 126 are relieved adjacent to guide member 136 to accommodate the bottles in each row being displaced away from one another. Similarly as for the case of tilting the bottles, lug members 118 are employed to provided the necessary clearance between the bottles in each row. Again it is evident that the provision of the clearance by the action of lug members 118 and the guide member 136 may be conducted simultaneously or in a predetermined sequential order.

With separation provided about the bottles in a group to be packaged the divider blank is inserted by being driven downwardly between belts 99 and 100 so as to enter between the bottles. The lateral partitions are disposed at substantially right angles to the longitudinal partion by means of guides 111, 112 and rollers 110 as well as the separating action of deflector 114. The speed of insertion is sufficiently fast to enable the divider blank to fully enter between the bottles and to preclude the possibility of the lateral partions moving to any measurable extent after they have left rollers 110 and deflector 114. In its downward descent the divider blank is stopped when longitudinal partition 35 comes into contact with elevated rail 125 or guide 136 as determined by the separating configuration being employed. Under the control of lug members 118 along chain 119, the groups of bottles with their inserted divider move forward from beneath the inserting means. As the groups pass beyond the inserting means, pressure wheel 137 mounted upon shaft 138 in arm 139 comes into contact with the upper edge of longitudinal partition 35. Arm 139 is attached by pivot 140 to plate 108 and is biased in a downward manner by the urging of spring 141. The urging of pressure wheel 137 insures that the longitudinal partitions are fully seated with respect to the bottles. Beyond the divider inserting means the bottles pass beyond controlled lug members 118 at sprocket 129 and are then received by conveyor 142 (FIG. 11).

In the drawings the divider is shown being applied to groups of bottles consisting of two rows of three bottles each. To properly separate such a group, a longitudinal partition and two pair of lateral partitions are required. It is evident that the machine may be adapted to insert divider blanks between groups having different arrangements of the bottles.

In a modified form of the machine curved portions 111 and 112 of folding bars 86 and 87 may be provided with extensions 143 and 144, respectively (FIG. 15). The extensions gradually release lateral partitions 40 and 43 as the divider blank passes from in contact with roller 110, thereby enabling the partitions to swing away from one another. The release of the partitions occurs as they approach the location of deflector 114.

The same modified form of the machine may also include guide members 145 and 146. The guide members are supported by brackets 147 and plates 148 attached to frame member 51 (FIG. 16). After the divider blanks are advanced around roller 110, lateral partitions 41 and 42 lose contact with the rollers and are engaged by tapered portions 145a and 146a of guide members 145 and 146, respectively. As the blanks descend toward the bottles, lateral partitions 41 and 42 are maintained at substantially right angles to the remainder of the blank by engagement with end portions 149 and 150 of guide members 145 and 146, respectively. In this way, the smooth passage of the erected divider blank onto the bottles is insured.

In still another modification of the machine, guide member 151 (FIG. 17) which maintains the rows of bottles separated as the divider blanks are inserted, is provided with an upper sloping surface 152. The sloping surface eliminates any tendency for the divider blank to bounce when contacting guide member 151. By virtue of sloping surface 152, the lower edge of longitudinal partition is directed at a downward angle against the bottles of one row and is thereby prevented from bouncing.

*Operation*

As a further aid to the understanding of my invention, I shall now describe the preferred sequence of operating steps.

Divider blanks 20 are fed from hopper 21 onto divider blank conveyor 24 which delivers the blank into the machine. During delivery the carton blanks are held flat against conveyor 24 by the pressure of overlying rails 52 and 53. The initial step in erecting the divider blanks occurs as the outer lateral partitions 40 and 43 pass over rotating folding lugs 58 which force the lateral partitions upwardly about their fold lines and out of the plane of longitudinal partition 35. While being supported on plates 62 and 63 the blank passes beneath rotating folder 64, rollers 69 of which fold lateral partitions 41 and 42 downwardly beneath the plane of longitudinal partition 45.

As the divider blank continues to advance folding bars 86 and 87 fold lateral partitions 40 and 43 down upon each other above guide 83. During the folding of lateral partitions 40 and 43, they are sufficiently flexed with respect to the other lateral partitions so that they may ultimately assume a position at right angles to the longitudinal partition.

Carton blanks 24 are then conveyed between moving belts 99 and 100. The portion of belts 99 and 100 which are in contact with one another along pulleys 102 and down to pulleys 105 engage and draw the carton blanks between them so as to move them forward and around pulleys 102. As the blank is drawn between the belts, lateral partitions 40 and 43 remain folded over curved portion 83a of guide 83 due to the urging of folding bars 86 and 87. At the same time, lateral partitions 41 and 42 are folded additionally away from one another by contacting rollers 110 and passing between the rollers and curved portions 111 and 112. As the blank approaches the lower portion of the vertical run of belts 99 and 100 adjacent to pulleys 103 and 105, lateral partitions 40 and 43 are forced outwardly by deflector 114 so that these partitions assume a position substantially at right angles to the longitudinal partition. At this point, the downwardly descending erected divider is ready to enter between the bottles.

Bottles 37 are delivered into the machine along conveyor 117 which passes beneath the divider inserting means and are disposed at substantially right angles to the divider blank conveyor 24. Conveyor 117 urges bottles 27 continually forward in the direction of divider inserting means. In order to separate the bottles from contact with each other in a given row lug members 118 attached to chains 119 are inserted between the incoming bottles. The interval between lug members 118 in the direction of travel of bottles is predetermined to be greater than the dimension of the bottles in the direction of travel. Lug members 118 oppose the urging of conveyors 117 so that the bottles are forced against the lug members thereby establishing clearance between one another. In order to separate the rows of bottles to receive longitudinal partitions 35, the bottles are tilted outwardly away from one another by means of the sloping section of base 124 upon which conveyor 117 is supported. In a modified form the rows of bottles may be separated by being diverted by guide member 136 having wedge-like end portions.

With the bottles separated from one another, belts 99 and 100 insert the erected divider blank 24 down between the bottles. The bottles are then conveyed away from the separating means and wheel 137 bearing upon the upper edge of the longitudinal partition insures that the divider is completely seated between the bottles.

What is claimed is:

1. In a machine for applying a folding divider blank to rows of containers to be packaged, the divider blank including a longitudinal partition adapted to divide the rows of containers and lateral partitions rotatably mounted in said longitudinal partition and adapted to divide the containers in a row from one another, means for delivering the divider blanks into the machine, means for delivering the containers into the machine, means for separating the containers being delivered from one another to receive the divider blank, means for erecting the lateral partitions at an angle to the longitudinal partition as the blanks are delivered, means for inserting the erected divider blanks between the containers, said means for separating the containers being delivered from one another including means for tilting the upper portions of the containers in one of said rows of containers away from the upper portions of the containers in the other of said rows, said tilting means being adjacent said means for inserting the erected divider blanks, driving means disposed along the side of the containers adjacent to said means for inserting the divider blanks, and lug members extending from said driving means toward the containers at intervals greater than the maximum dimension of the containers in the direction of travel of the containers, said lug members being adapted to engage the containers and to position the containers with an interval between one another in the direction of travel.

2. A machine in accordance with claim 1 in which said means for tilting the upper portions of the containers in one of said rows of containers away from the upper portions of the containers in the other of said rows includes means for supporting each of the rows of containers being delivered, the longitudinal axis of said supporting means being disposed substantially in the direction of travel of the containers and the lateral axis of each of said supporting means being disposed at an angle to the adjacent rows whereby the containers of a row being delivered on each of said supporting means have their upper portions displaced from those of the adjacent rows.

3. A machine in accordance with claim 1 in which said means for delivering the containers includes container conveying means and in which said means for tilting the upper portions of the containers in one row from the upper portion of the containers in the other of said rows includes a length of said container conveying means in the direction of travel in which each portion of said conveying means underlying each row of containers has its lateral axis disposed at an angle to the adjacent portions, whereby the containers of each row have their upper portions displaced from those of the adjacent rows.

4. A machine in accordance with claim 1 in which said means for delivering the containers includes container conveying means and in which said means for tilting the upper portions of the containers in one row from the upper portions of the containers in the other of said rows includes a length of said container conveying means in the direction of travel in which each portion of said conveying means underlying each row of containers has its lateral axis disposed at an angle to the adjacent portions, and guide means adjacent the outer side portion of the container, whereby the containers of each row have their upper portions displaced from those of the adjacent rows.

5. A machine in accordance with claim 1 in which said means for delivering the containers includes container conveying means and in which said driving means has a linear speed less than that of said container conveying means, whereby said lug members engage and hold said containers against the urging of said container conveying means.

6. In a machine for applying a folding divider blank to rows of containers to be packaged, the divider blank including a longitudinal partition adapted to divide the rows of containers and lateral partitions rotatably mounted in said longitudinal partition and adapted to divide the containers in a row from one another, means for delivering the divider blanks into the machine, means for delivering the containers into the machine, means for separating the containers being delivered from one another to receive the divider blank, means for erecting the lateral partitions at an angle to the longitudinal partition as the blanks are delivered, means for inserting the erected divider blanks between the containers, said means for separating the containers being delivered from one another including means for diverting the rows of containers away from one another, driving means disposed along the side of the containers adjacent to said means for inserting the divider blanks, and lug members extending from said driving means toward the containers at intervals greater than the maximum dimension of the containers in the direction of travel of the containers, said lug members being adapted to engage the containers and to position the containers with an interval between one another in the direction of travel.

7. A machine in accordance with claim 6 in which said means for diverting the rows of containers away from one another includes a guide member having wedge-like end portions disposed with its longitudinal axis between the row of containers substantially parallel to the direction of travel of the containers.

8. A machine in accordance with claim 6 in which said means for diverting the rows of containers away from one another includes a guide member having wedge-like end portions disposed with its longitudinal axis between the rows of containers, said guide member having an upper surface sloping from one side of the path of the containers to the other, said sloping surface contacting the lower edge of said longitudinal partition upon insertion of the erected divider blank between the containers.

9. In a machine for applying a folding divider blank to rows of containers to be packaged, the divider blank including a longitudinal partition adapted to divide the rows of containers and lateral partitions rotatably mounted in said longitudinal partition and adapted to divide the containers in a row from one another, means for delivering the divider blanks into the machine, means for delivering the containers into the machine, means for separating the containers being delivered from one another to receive the divider blank, means for erecting the lateral partitions at an angle to the longitudinal partition as the blanks are delivered, means for inserting the erected divider blanks between the containers, the lateral partitions of the divider blanks being rotatably mounted in pairs about a common axis and extending away from one another in the plane of the longitudinal partition, said means for erecting the lateral partitions including means for folding one partition of each of said pairs of lateral partitions in a predetermined direction to a predetermined position with respect to the longitudinal partition, and means for folding the other partitions of said pairs in the direction opposite to that of said predetermined direction to a predetermined position, whereby said blank is prepared for insertion between said containers with said pairs of lateral partitions at substantially right angles to the longitudinal partition.

10. In a machine for applying a folding divider blank to rows of containers to be packaged, the divider blank including a longitudinal partition adapted to divide the rows of containers and lateral partitions rotatably mounted in said longitudinal partition and adapted to divide the containers in a row from one another, means for delivering the divider blanks into the machine, means for delivering the containers into the machine, means for separating the containers being delivered from one another to receive the divider blank, means for erecting the lateral partitions at an angle to the longitudinal partition as the blanks are delivered, means for inserting the erected divider blanks between the containers, the lateral partitions of the divider blanks being rotatably mounted in pairs about a common axis and extending away from one another in the plane of the longitudinal partition, said means for erecting the lateral partitions including means for folding one partition of each of said pairs of lateral partitions in a predetermined direction to a predetermined position with respect to the longitudinal partition, means for folding the other partitions of said pairs in the direction opposite to that of said predetermined direction to a predetermined position, and means for urging said lateral partitions in said predetermined direction substantially into the plane of said longitudinal partition, whereby said blank is prepared for insertion between said containers with said pairs of lateral partitions at substantially right angles to the longitudinal partition.

11. In a machine for applying a folding divider blank to rows of containers to be packaged, the divider blank including a longitudinal partition adapted to divide the rows of containers and lateral partitions rotatably mounted in said longitudinal partition and adapted to divide the containers in a row from one another, means for delivering the divider blanks into the machine, means for delivering the containers into the machine, means for separating the containers being delivered from one another to receive the divider blank, means for erecting the lateral partitions at an angle to the longitudinal partition as the blanks are delivered, means for inserting the erected divided blanks between the containers, the lateral partitions of the divider blank being positioned adjacent one another in pairs and extending away from one another in the plane of the longitudinal partition, one lateral partition of each of the pairs being rotatably attached to the longitudinal partition, the other lateral partitions of each of said pairs being rotatably attached to said one lateral partition about an axis substantially coincident with the axis of rotation of said one lateral partition, said means for erecting the lateral partitions including means for folding said other partitions in a predetermined direction to a predetermined position with respect to the longitudinal partition, means for folding said one lateral partition in the direction opposite to that of said predetermined direction to a predetermined position, and means for urging said one lateral partition in said predetermined direction substantially into the plane of said longitudinal partion, whereby said blank is prepared for insertion between said containers with said pairs of lateral partitions at substantially right angles to the longitudinal partition.

12. In a machine for applying a folding divider blank to rows of containers to be packaged, the divider blank including a longitudinal partition adapted to divide the rows of containers and lateral partitions rotatably mounted in said longitudinal partition and adapted to divide the containers in a row from one another, means for delivering the divider blanks into the machine, means for delivering the containers into the machine, means for separating the containers being delivered from one another to receive the divider blank, means for erecting the lateral partitions at an angle to the longitudinal partition as the blanks are delivered, means for inserting the erected divider blanks between the containers, the lateral partitions of the divider blank being positioned adjacent one another in pairs and extending away from one another in the plane of the longitudinal partition, one lateral partition of each of the pairs being rotatably attached to the longitudinal partition, the other lateral partitions of each of said pairs being roatably attached to said one lateral partition about an axis substantially coincident with the axis of rotation of said one lateral partition, said means for erecting the lateral partitions including means for folding said other partitions in a predetermined direction to a predetermined position with respect to the longitudinal partition, means for folding said one lateral partition in the direction opposite to that of said predetermined direction to a predetermined position, means for urging said one lateral partition in said predetermined direction substantially into the plane of said longitudinal partition, and means for folding said other lateral partitions in predetermined direction from said predetermined position substantially into the plane of said longitudinal partition, whereby said blank is prepared for insertion between said containers with said pairs of lateral partitions at substantially right angles to the longitudinal partition.

13. In a machine for applying a folding divider blank to rows of containers to be packed, the divider blank including a longitudinal partition adapted to divide the rows of containers and lateral partitions rotatably mounted in said longitudinal partition and adapted to divide the containers in a row from one another, means for delivering the divider blanks into the machine, means for delivering the containers into the machine, means for separating the containers being delivered from one another to receive the divider blank, means for erecting the lateral partitions at an angle to the longitudinal partition as the blanks are delivered, means for inserting the erected divider blanks between the containers, said means for inserting the erected divider blanks between the containers including means for maintaining the relative positions of the erected divider blank partitions, means for rotating the divider blank from the position of the blanks in said erecting means to a position in conformity with the containers being separated, and means for urging the blanks between the containers being separated, said means for rotating the divider blanks including wheel members disposed in the path of travel of the blanks and belt means moving around the wheel members, said belt means engaging the blanks and advancing the blanks around said wheel members into alignment with the containers being separated.

14. A machine in accordance with claim 13 in which said means for urging the blanks between the containers includes a portion of said belt means ending adjacent said means for separating the containers and adapted to move the blanks beyond said ending and between the containers being separated.

15. In a machine for applying a folding divider blank to rows of containers to be packaged, the divider blank including a longitudinal partition adapted to divide the rows of containers and lateral partitions rotatably mounted in said longitudinal partition and adapted to divide the containers in a row from one another, means for delivering the divider blanks into the machine, means for delivering the containers into the machine, means for separating the containers being delivered from one another to receive the divider blank, means for erecting the lateral partitions at an angle to the longitudinal partition as the blanks are delivered, means for inserting the erected divider blanks between the containers, said means for inserting the erected divider blanks between the containers including means for maintaining the relative positions of the erected divider blank partitions, means for rotating the divider blank from the position of the blanks in said erecting means to a position in conformity with the containers being separated, and means for urging the blanks between the containers being separated, said means for rotating the divider blanks including wheel members disposed in the path of travel of the blanks and a pair of overlying belt members moving around each of said wheel members in the same direction and proximate to one another, said belt members being disposed with respect to the path of travel of the blanks to receive the blanks therebetween and to pass the blank around the roller members into alignment with the containers being separated.

16. A machine in accordance with claim 13 in which said means for urging the blanks between the containers includes a portion of said overlying belt members being proximate to one another and ending adjacent said means for separating the containers, said overlying belts moving the blanks engaged therebetween beyond said ending and into engagement with said containers being separated.

17. In a machine for applying a folding divider blank to rows of containers to be packaged, the divider blank including a longitudinal partition adapted to divide the rows of containers and lateral partitions rotatably mounted in said longitudinal partition and adapted to divide the containers in a row from one another, means for delivering the divider blanks into the machine, means for delivering the containers into the machine, means for separating the containers being delivered from one another to receive the divider blank, means for erecting the lateral partitions at an angle to the longitudinal partition as the blanks are delivered, means for inserting the erected divider blanks between the containers, the lateral partitions of the divider blank being positioned adjacent one another in pairs and extending away from one another in the plane of the longitudinal partition, one lateral partition of each of the pairs being rotatably attached to the longitudinal partition, the other lateral partition of each of said pairs being rotatably attached to said one lateral partition about an axis substantially coincident with the axis of rotation of said one lateral partition, said means for erecting the lateral partitions, including means for folding said other partitions in a predetermined direction to a predetermined position with respect to the longitudinal partition, means for folding said one lateral partition in direction opposite to that of said predetermined direction to a predetermined position, and means for urging said one lateral partition in said predetermned direction substantially into the plane of said longitudinal partition, and in which said means for inserting the erected divider blanks between the containers includes means for maintaining the relative positions of the erected divider blank partitions, means for rotating the divider blanks from the position of the blanks in said erecting means to a position in conformity with the containers being separated, means for urging said one lateral partition out of the plane of said longitudinal partition, and means for urging the divider blank between the containers being separated.

18. In a machine for applying a folding divider blank to rows of containers to be packaged, the divider blank including a longitudinal partition adapted to divide the rows of containers and at least one integral lateral partition extending on opposite sides of a hinge line by which said lateral partition is integrally attached to said longitudinal partition and adapted to divide the containers in a row from one another, means for delivering the divider blanks into the machine, and means for rotating the lateral partitions from the plane of the longitudinal partition to a position at an angle to the longitudinal partition, said last-named means including a member which presses against said lateral partition at one side of said hinge line to produce rotation in a given direction around said hinge line and another member which presses against said lateral partition at the other side of said hinge line to produce rotation in said given direction around said hinge line whereby the rotating pressures are exerted on both sides of said hinge line to reduce any tendency of said lateral partition to fold at the point where it crosses said hinge line.

19. A machine in accordance with claim 18 which includes means for actuating said members sequentially whereby said one member initiates rotation of said lateral partition and said other member continues such rotation.

References Cited in the file of this patent

UNITED STATES PATENTS

| | | |
|---|---|---|
| 2,624,989 | White | Jan. 13, 1953 |
| 2,678,151 | Geisler | May 11, 1954 |
| 2,830,749 | Lauritzen | Apr. 15, 1958 |
| 2,864,212 | Bruce | Dec. 16, 1958 |
| 2,867,151 | Moore | Jan. 6, 1959 |
| 2,897,641 | Simon et al. | Aug. 4, 1959 |
| 2,898,718 | Willis | Aug. 11, 1959 |
| 2,936,558 | Glazer | May 17, 1960 |
| 2,943,762 | Richardson | July 5, 1960 |
| 2,968,898 | Hickin | Jan. 24, 1961 |

UNITED STATES PATENT OFFICE
CERTIFICATE OF CORRECTION

Patent No. 3,031,813

May 1, 1962

Robert H. Ganz

It is hereby certified that error appears in the above numbered patent requiring correction and that the said Letters Patent should read as corrected below.

Column 3, line 14, for "bed" read -- fed --; column 4, line 9, strike out "in"; column 5, line 59, for "provided" read -- provide --; line 74, for "partions" read -- partitions --; column 10, line 3, for "divided" read -- divider --; line 20, for "partion" read -- partition --; line 42, for "roatably" read -- rotatably --; line 60, for "packed" read -- packaged --; column 12, line 15, for "predetermned" read -- predetermined --; line 59, for "2,867,151" read -- 2,867,157 --.

Signed and sealed this 11th day of September 1962.

(SEAL)
Attest:

ERNEST W. SWIDER
Attesting Officer

DAVID L. LADD
Commissioner of Patents